Feb. 20, 1968     P. R. NOYES     3,369,959
LAMINATE OF POLYVINYL FLUORIDE

Filed Oct. 25, 1963     3 Sheets-Sheet 1

INVENTOR
PAUL RANDOLPH NOYES
BY
ATTORNEY

United States Patent Office 3,369,959
Patented Feb. 20, 1968

3,369,959
LAMINATE OF POLYVINYL FLUORIDE
Paul Randolph Noyes, Wilmington, Del., assignor to E. I. du Pont de Nemours and Company, Wilmington, Del., a corporation of Delaware
Filed Oct. 25, 1963, Ser. No. 318,896
7 Claims. (Cl. 161—189)

This invention relates to laminated structures and more particularly to laminated structures of polyvinyl fluoride films, water resistant and resilient backing materials and acrylic based adhesives.

Prior art laminates suitable as a group surfacing material are usually prepared with standard adhesive compositions such as a nitrile rubber based compound. Accelerated weathering tests conducted in the laboratory which subjects such a laminate to heat, water and light showed that this rubber modified adhesive is subject to degradation with a resulting overall weakness in the strength of the bond between the polyvinyl fluoride film and the backing material. Outdoor weathering tests substantiated the laboratory data. It was found that groups installed with laminate constructed with the nitrile rubber based adhesives remained functional and in good appearance after two years exposure to the weather but the strength of the film/felt bond had decreased markedly.

It is, therefore, an object of this invention to provide a laminated structure which has superior resistance to embrittlement caused by heat and light.

It is another object of this invention to provide a laminated structure which has a perpetually soft elastomeric adhesive bond under all weathering conditions and which remains in this state for the life of the laminate.

It is a further object of this invention to provide a roof surfacing laminated structure of an opaque polyvinyl fluoride film, a modified acrylic adhesive and a water resistant, resilient, flexible backing material. These and other objects will appear hereinafter.

These and other objects of this invention are accomplished briefly by a laminate of an opaque, surface receptive polyvinyl fluoride film bonded to a water-resistant, resilient, flexible backing material with an adhesive comprising a polyalkyl acrylate, an isocyanate curing agent and carbon black.

The invention will be further described particularly in connection with the accompanying drawings wherein.

Figure 1:
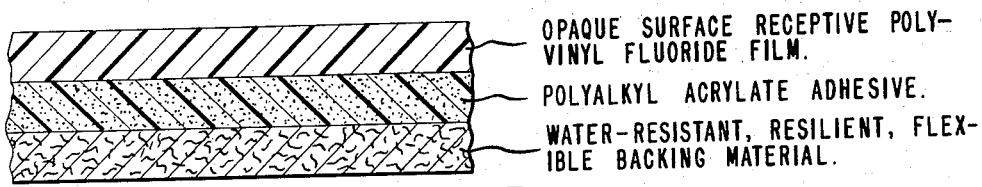
FIGURE 1 is a schematic cross-sectional view of the laminate constructed according to the invention.

Polyvinyl fluoride films useful for purposes of this invention can be made by a variety of means. A particularly useful method for making polyvinyl fluoride films consists of the steps of feeding a latent solvent/particulate polyvinyl fluoride mixture to a heated extruder which is connected to a slotted casting hopper, from whence a tough, coalesced gel polyvinyl fluoride film containing latent solvent is continuously extruded. This latent solvent-containing film is then stretched first longitudinally over heated rolls and then transversely in a tenter frame, in which it is held in restraint while the remaining latent solvent is volatilized. These extrusion and stretching procedures are described in detail in U.S. Patent No. 2,953,818, issued in the name of Lester Ray Bartron and copending U.S. Patent application Ser. No. 801,441, filed Mar. 24, 1958, in the names of Robert Smith Prengle and Robert Lawrence Richards, Jr. and assigned to the assignee of the present invention. Unoriented polyvinyl fluoride film is also useful in this invention.

The polyvinyl fluoride film must also be opaque. This is accomplished by incorporating various pigments in the polyvinyl fluoride during mixing of the feed prior to extrusion. The polyvinyl fluoride film used in the preferred embodiment of this invention contains about 25% titanium dioxide, based on the weight of the polyvinyl fluoride polymer, incorporated in the polyvinyl fluoride/latent solvent mixture fed to the extruder. Of course, other opaque pigments of any desired color can be used to make the polyvinyl fluoride film opaque to ultraviolet and visible light. Such pigments would include lamp black, chrome yellow, cadmium selenide red, phthalocyanine blue, phthalocyanine green and blends of these pigments. These pigments can be incorporated into the polyvinyl fluoride film in amounts of up to about 25–30%, based on the weight of the polyvinyl fluoride polymer. Pigment concentration over about 30% tends to make the film chalky. The minimum amount of pigment that can be employed depends upon the pigment used but it must be sufficient to render the film opaque to ultraviolet and visible light.

Another critical feature of this invention is that the polyvinyl fluoride film must be surface receptive, i.e., at least one and preferably two of its surfaces should contain functional groups selected from one or more of the group consisting of ethylenic unsaturation and hydroxyl, carboxyl, carbonyl, amino and amido groups. This means that the surface is receptive to adhesive, i.e., the adhesive is permitted to be bound firmly to the film. Polyvinyl fluoride films can be rendered surface receptive and thereby suitable for use in the present invention by any of a number of surface treatments. For example (1) they can be passed through a stainless steel lined treating chamber containing a gaseous mixture consisting of from about 10% to 90% boron trifluoride maintained at a temperature in the range of from about 20° C. to 75° C. for a period of from about 3–30 seconds, followed by either (a) washing in an ammonium hydroxide solution followed by a water-wash and drying in air; or (b) a water-wash followed by drying in air; or (c) heating for a brief period at temperatures ranging between about 100° C. and 150° C.; or (2) they can be immersed in or contacted with concentrated sulfuric acid, fuming sulfuric acid or sulfur tri-oxide, for brief periods of time ranging from about 2 seconds to about 1 minute, followed by a water-wash and then air drying. This can be done at temperatures ranging from about 25° C. to as high as 95° C. It will be understood, of course, that the exposure time necesary to render the film surface receptive will decrease as either the concentration of the acid or the temperature of the solution is increased; or (3) they can be immersed briefly in boron trifluoride-etherate complexes followed by either a water-wash or an ether wash followed by heating in air to dry. Such immersions can vary widely in time and will depend somewhat upon the temperature at which the complex is maintained; or (4) they can be flame treated by passing at rates of from 100–250 feet per minute over and in contact with a chilled metal drum while the surface away from the drum passes through the flame of a gas burner fueled with a 1:20 propane:air mixture; or (5) they can be subjected to a high frequency spark discharge in an atmosphere comprising chiefly nitrogen by passing at rates of from 10 to 300 feet per minute over and in contact with a grounded metal drum while the surface away from the drum passes under and in close proximity to (1/32 inch to 1/2 inch) a rod or bar serving as the electrode, the electrode being connected to a source of high frequency alternating voltage.

To make the film functional as a roofing material, it must be adhered to a water-resistant, resilient, flexible backing material which gives the film the necessary handling characteristics, cushioning effect, and adherability so that conventional methods for installing roofing can be used. The water resistant, resilient, flexible backing material useful for this invention is a saturated felt. Felts used in roofing consist of a base mat and a binder material. Asbestos base felts are completely inert and therefore have a long life expectancy and are preferred for this invention.

The binder used in the felt backing material is also important. Asphalt binders are the most common and least expensive but have the limitation that the asphalt composition is not uniform in consistency from one batch compared to another, which results in an inferior laminate and also, felts impregnated with asphalts tend to dry out and become brittle with age. The preferred binder material consists of neoprene rubber since neoprenes are markedly resistant to oils, greases, chemicals, ozone and heat. Another useful binder material consists of a copolymer of 90% neoprene and 10% acrylonitrile. Photo stable nitrile or acrylate rubbers are particularly useful binders since these do not degrade upon exposure to light; however, these rubbers are not widely accepted as a roofing substrate since the fire rating of these materials are not acceptable to most fire codes. Therefore, the preferred flexible, water resistant backing material of this invention consists of an asbestos felt impregnated with a 100% neoprene binder in which the binder is present in the amounts from 18 to 22%. Non-woven fiber glass mat can also be used as a backing material.

To have a roofing laminate which will remain functional for many years, it is required that the adhesive used in the laminate provide a perpetually soft elastomeric bond under all types of weathering conditions. Both light and heat cause most adhesives to lose their elastomeric character. As degradation of an adhesive proceeds, it hardens and becomes glass-like which causes either a complete delamination of the film from the substrate or as occurs most often, the film becomes so tightly bonded to the felt that the laminate assumes the poor elongation characteristics of the adhesive. If the latter occurs, outdoor weathering or laboratory weathering tests will cause the film to fail by either cracking or tearing. This can be easily explained since in a weathering test the laminate is constantly expanding or contracting due to temperature changes. Obviously, the two substrates, the film and the felt backing material have different thermal expansion coefficients; also, the entire laminate is not subject to the same temperature since the exposed surface would warm and cool faster than the substrate which is bonded to the roof sub-structure. From this it is quite evident that if the adhesive of the lamination hardens and becomes brittle, either the film will delaminate or it will remain bonded tightly in place. If the bond is retained between the film and the adhesive, stressing will cause the embrittled adhesive to break. When this occurs the film is stressed at an infinitesimally small point which results in breaking or tearing of the film.

The adhesive commonly used for laminations of polyvinylfluoride film and a flexible substrate consist of a copolymer of butadiene acrylonitrile to which has been added an isocyanate reaction product and which is similar to those adhesives described in U.S. Patent 2,673,826. These nitrile rubber based adhesives initially provide a soft elastomeric bond to the laminate, but when exposed to visible light and heat the adhesive degrades and loses its elastomeric character.

A second problem occurs when the preferred backing material which is a neoprene saturated asbestos felt is exposed to light. Radiation in the visible and ultraviolet region readily attacks the neoprene binder and hardens and embrittles it in a similar manner to the rubber adhesive. Once the felt backing is weakened, delamination will occur readily after a period of time. With a neoprene saturated backing material, this degradation occurs at a relatively slow rate. However, in the construction of buildings, asphaltic oil based compounds are used to adhere the laminate to the roof structure. These oils soak into the felted backing material and increase the light degradation of the neoprene asbestos felt by a factor of five times or more.

From the above facts it is apparent that the preferred adhesive must retain its soft, elastomeric character for long periods of time under all types of weathering conditions and must also block or reduce the amount of light penetrating through to the substrate. The adhesive composition found most effective consists of a polyalkyl acrylate preferably poly lower alkyl acrylate, to which is added a diisocyanate reaction product and a small amount of carbon black. The diisocyanate reaction product is needed for improved bond strength and improved hydrolytic stability. The preferred adhesive composition consists of polyethyl acrylate, approximately 10% on a weight basis of the reaction product of trimethylol propane toluene diisocyanate, and about 2–25% carbon black.

When laminating the PVF film to a flexible substrate on a commercial laminator using the preferred adhesive composition, the viscosity of the polyethyl acrylate is critical. Best results are obtained with a polymer of a viscosity under 8,000 centipoises. The problem becomes obvious when the method of application of the adhesive to the film is known. In most laminating machines the adhesive is applied by a single roller which as partially immersed in the adhesive and the upper part contacts the film or by a set of rollers in which the lower roller is immersed in the adhesive and in contact with the second roller which contacts the film. A highly viscous adhesive cannot be used since too heavy a coating is applied to the film. Therefore, to obtain the correct viscosity the adhesive which in this case is the polyethyl acrylate, carbon black and the isocyanate reaction product is diluted with a solvent. The preferred solvent is methyl ethyl ketone but other ketone solvents such as acetone and methyl isobutyl ketone can be used. The preferred adhesive solution viscosity is approximately 10–50 seconds as measured by a No. 3 Zahn cup at 63° F.

When a highly viscous polymer (10,000–15,000 centipoises) is used to make up the adhesive solution, the percent solids of polymer in the solution at a given viscosity is low and gives poor adhesion. When a less viscous polymer is used (under 8,000 centipoises) the amount of polymer in solution is sufficient to provide good adhesion.

When roofs are covered with the laminate of this invention, the sheets of laminate are placed to form a lap joint (1 inch minimum—3 inches maximum) or side by side so as to form a butt joint. Obviously, if this joint is not covered, moisture will seep through this minute opening and cause damage to the roof sub-structure. This is simply overcome by taping the joints with a polyvinyl fluoride tape which has a weatherable adhesive. To have adequate adhesion of the tape and the polyvinyl fluoride laminate, the top surface of the laminate should also be surface receptive; therefore, the preferred film for the laminate is a two-side surface receptive film. Also, the polyvinyl fluoride film used for the tape must be two-side surface receptive so that the weatherable adhesive will adhere and in many cases the tape will be overlapped making it desirable that the surface of the tape be treated. In the roll form the pressure sensitive adhesive does not adhere to the adjacent layer of tape since the manufacturer treats the adhesive with an anti-stick agent. This agent is deactivated once the tape is applied.

The invention can be more fully understood by referring to the following examples:

Example I

The amount of reaction product of trimethylol propane and toluene diisocyanate which has to be added to the polyethyl acrylate to give maximum bond strength is determined by mixing various concentrations of the reaction product in amounts of 0, 5, 10, 20, 25 and 33% (based on the weight of solids in the adhesive) with polyethyl acrylate. These adhesive compositions are then placed on 2 mil biaxially oriented, opaque, two-side surface receptive polyvinyl fluoride film, which film contains approximately 25% titanium dioxide, by using a glass draw down rod. The thickness of the dry or solvent-free adhesive layer is approximately 0.3 mil. A second sheet of the above film is placed on the adhesive and the resulting structure is cured for 2 days at room temperature.

Film is used instead of the felted backing material since the backing material is weaker than the adhesive bond thereby making it impossible to measure the adhesive bond strength. After curing, the laminates are cut into one inch wide strips and the bond strength measured on an Instron Tester.

Figure 2:
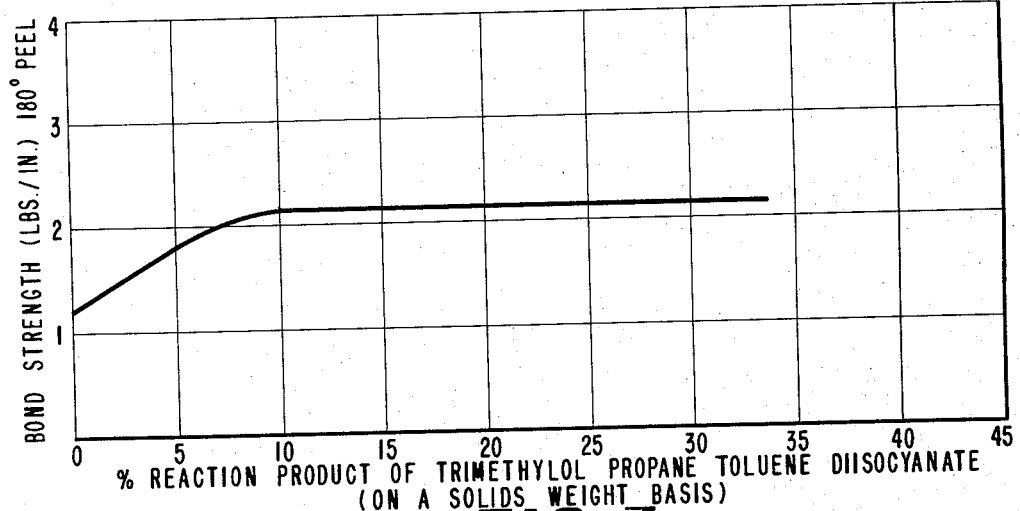
FIGURE 2 shows the effect of isocyanate addition on adhesive bond strength.

The results of this test are shown in FIGURE 2. It is noted that when the amount of reaction product reached approximately 10% the bond reached maximum strength of 2.2 lbs. and did not increase or decrease with an increase of reaction product.

Example II

To determine the amount of carbon black which can be added to the adhesive system without degrading the bond strength, the following test is conducted. To a basic mixture of 89% of polyethyl acrylate and 11% of the reaction product of trimethylol propane and toluene diisocyanate various concentrations from 0 to 23% of carbon black are added. These various compositions are then coated on a 2 mil biaxially oriented, opaque, two-side surface receptive, polyvinyl fluoride film with the adhesive being approximately 0.3 mil in thickness when dry and to which a second sheet of the said film is adhered. The laminate is cured for 6 days at room temperature and then cut into one inch wide strips and the bond peel strength is checked on an Instron Tester as in Example I.

Figure 3:
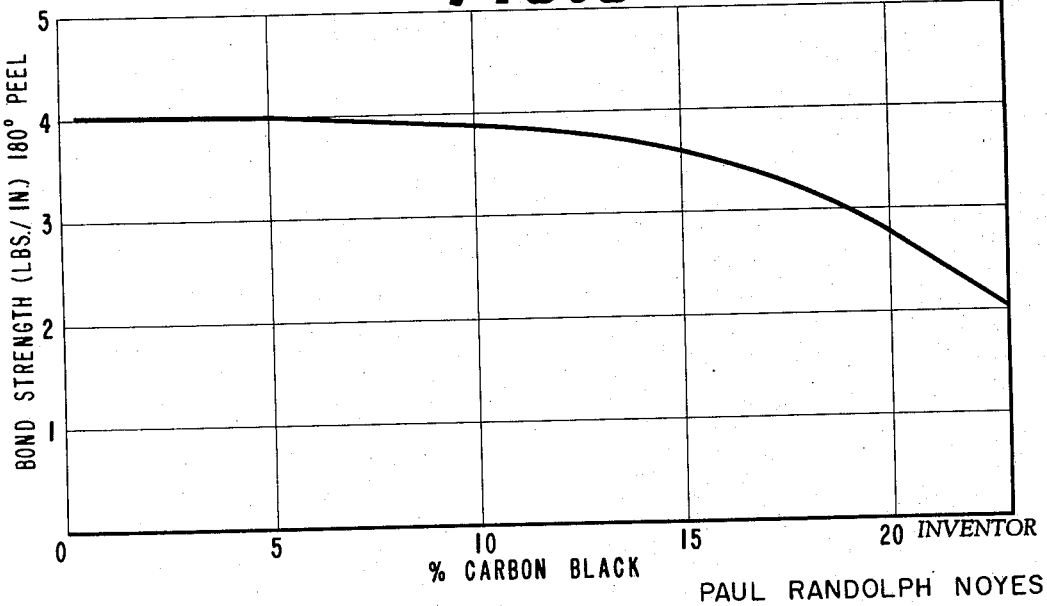
FIGURE 3 shows the effect of carbon black concentration on adhesive bond strength.

The results of this test are shown in FIGURE 3. It is noted that even at the 23% carbon loading the bond strength is still approximately 2 lbs. This is still slightly greater than the strength of the neoprene saturated asbestos felted material used in the roofing structure; therefore, the laminate will still peel at the felt/adhesive interface. (The bond strengths of Examples I and II differ because of the curing times used before the bond was tested.)

Example III

Since degradation of the felted substrate is caused by light, it is desirable to know the percent of light transmitted through the film and the adhesive. Sheets of 2 mil biaxially oriented, opaque (containing 25% titanium dioxide) two-side surface receptive polyvinyl fluoride film are coated with an adhesive composition with varying percents of carbon. The adhesive compositions consist of a base of 90% polyethyl acrylate and 10% of the reaction product of trimethylol propane and toluene diisocyanate to which has been added from 1 to 25% carbon black. The coating is placed on the film with a Gardner knife which is an instrument which gives a controlled even coating weight. There are two blades in the knife, the bottom blade remains stationary whereas the top blade is adjustable. The film is coated with the adhesive, then the film is positioned between the blades of the Gardner knife which is then pulled over the film. The adhesive thickness is approximately 0.3 mil thick when dry. The films with the various adhesive compositions containing various amounts of carbon black are then measured for the amount of light which is transmitted through the film and the adhesive layer. The instrument which is used is an angular dependent light scattering apparatus which provides a sensitive measurement of transmitted light. This instrument employs an intense monochromatic light source (5461 Angstroms; green), and a sensitive photo detector. As little as 0.005% transmission of light can be measured.

The following table contains the results of the test.

| Percent carbon in the adhesive formulation: | Percent transmission at 5461 Angstroms |
|---|---|
| 1 | 3.3 |
| 2 | 1.2 |
| 4 | 0.2 |
| 6 | 0.06 |
| 8 | 0.01 |
| 10 | 0.005 |
| 25 | 0.005 |
| Opaque black body | .002–.005 |

From the above data it is apparent that 6% carbon black in the adhesive composition eliminates most of the visible light. Obviously, the higher the percent of carbon black the more protection the substrate will receive from visible light.

Example IV

Figure 4:
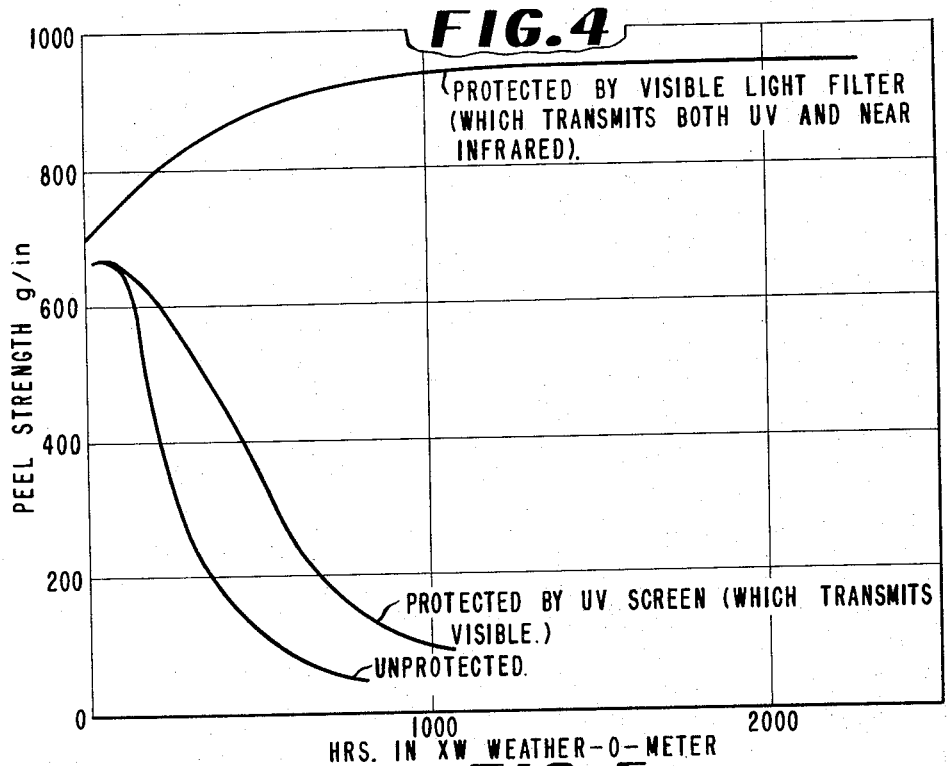
FIGURE 4 shows the effect of ultraviolet and visible light and visible light screens upon the adhesive bond.

Since it is known that light degrades the adhesive felt bond of the laminate, it becomes desirable to know from which wave-lengths of light the felted backing must be protected. This is accomplished by adhering a two mil biaxially oriented, opaque (containing 25% titanium dioxide), two-side surface receptive polyvinyl fluoride film to an asbestos felt 0.025 inch thick containing approximately 18–22% neoprene rubber with an adhesive. The adhesive being 0.3 mil in thickness when dry and consisting of polyethyl acrylate with approximately 10% (based on the weight of solids in the adhesive) of the reaction product of trimethylol propane and toluene diisocyanate. The lamination is carried out by passing the laminate through nip rollers in which the roller next to the film is cold and the roller next to the felt is at approximately 150° F. Samples are then cut and placed in an X–W Weather-O-Meter which subjects the laminate to light in the range of 2800 to 33,000 Angstroms for 108 minutes and a wetting cycle with water and light for 12 minutes; 12% of the light is in the ultraviolet range, 29% in the visible, and the remainder is in the infrared range. The light source is a carbon arc. A Corex D filter is used so that the samples are exposed to the above light range. The samples are divided into three groups. The first group is protected from visible light by a Corning 7–54 light filter which blocks light in the range of 3800 to 8000 Angstroms; however, this filter does transmit ultraviolet and near infrared light. The second group of samples are protected by weatherable polyethylene terephthalate film which contains an agent which screens out ultraviolet light but allows all other light to pass. The third group of samples are unprotected. At periodic intervals samples are removed and the bond strength is checked by cutting the sample one inch wide and pulling at a 180° angle on an Instron Tester as in Example I. The results of this test are shown in FIGURE 4. It is noted from this data that visible light substantially degrades the felt adhesive bond strength.

Example V

It is desirable to determine which flexible backing materials have resistance to light degradation. This is accomplished by adhering a 2 mil biaxially oriented, opaque (containing 25% titanium dioxide), two-side surface receptive polyvinyl fluoride film to asbestos felt substrates containing various binder materials using an adhesive comprising 90% polyethyl acrylate and 10% of the reaction product of trimethylol propane and toluene diisocyanate. The adhesive thickness is approximately 0.3 mil.

The different types of asbestos felt materials which are used are an asbestos impregnated with a butadiene-acrylonitrile copolymer binder, an asbestos impregnated with polyethyl acrylate, an asbestos impregnated with a copolymer consisting of 90% neoprene and 10% acrylonitrile with approximately 15 to 20% binder, an asbestos impregnated with 100% neoprene containing approximately 18 to 22% binder, and an asbestos impregnated with asphalt containing approximately 15–25% asphalt binder. All of the felts are approximately 0.025 inch in thickness.

Figure 5:
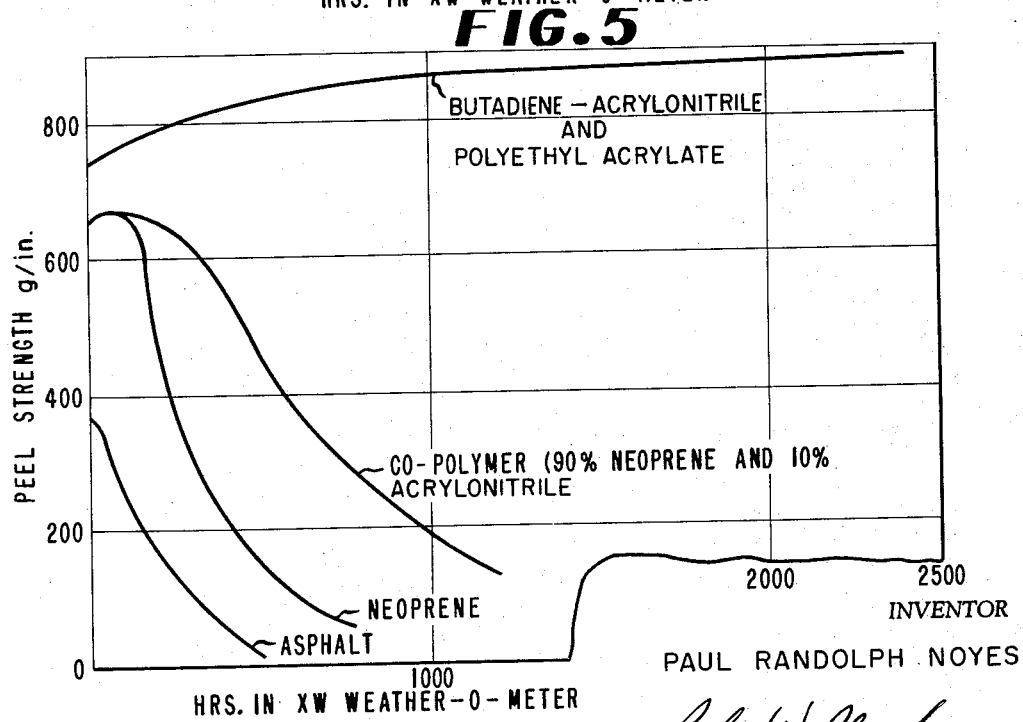
FIGURE 5 shows the effect of the backing material binder on bond durability.

Samples of these laminates are cut and mounted in an X–W Weather-O-Meter which subjected these samples to 102 minutes of light and 18 minutes of a water spray and light. Periodically samples are removed and the bond strength is measured by pulling at a 180° angle on an Instron Tester as in Example I. The results of this test are shown in FIGURE 5. After 2200 hours of exposure the butadiene-acrylonitrile impregnated asbestos felt and the polyethyl acrylate impregnated asbestos felt showed no bond degradation whereas the asphalt, neoprene, and the copolymer impregnated felts all showed degradation within less than 1000 hours of testing. This example illustrates the need of a source to block visible light from the preferred neoprene impregnated asbestos felt to prevent adhesive bond degradation.

*Example VI*

In the previous examples it has been shown that light degrades the adhesive felt bond in the preferred laminate structure. It has also been shown that carbon black added to the adhesive reduces light transmission. It becomes desirable to determine on a laminated structure which adhesive composition will function adequately, under conditions of weather. This is accomplished by adhering 2 mil biaxially oriented, opaque (containing about 25% titanium dioxide), two-side surface receptive polyvinyl fluoride film to an asbestos felted backing material containing 18–22% neoprene binder with adhesive compositions containing 0, 2, 4, 6 and 25% carbon black.

Figure 6:
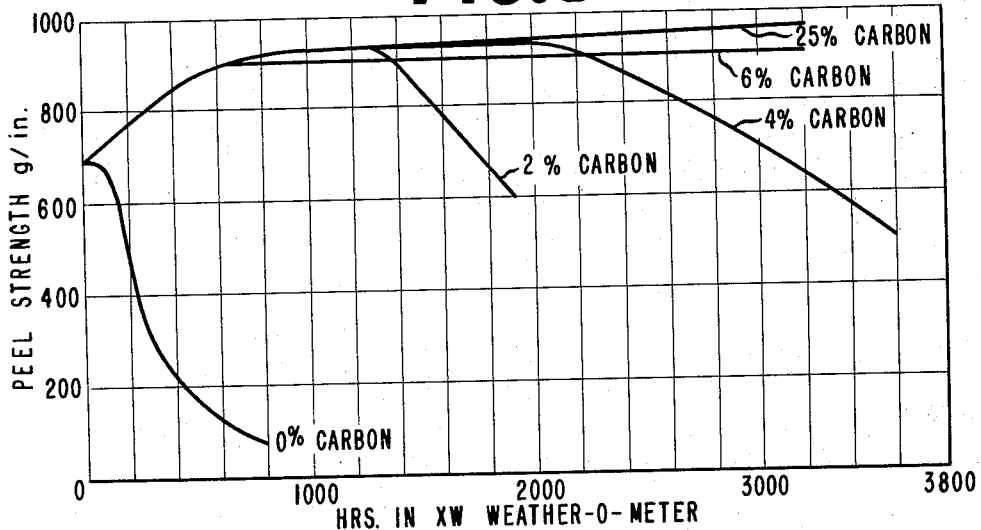
FIGURE 6 shows the effect of carbon black pigmented adhesives on weatherability of the laminate and FIGURE 7 shows the strength of the laminate/tape bond as a function of having functional units present on both sides of the polyvinyl fluoride film.

The compositions of the adhesives are 90% polyethyl acrylate and 10% of the reaction product of trimethylol propane toluene diisocyanate with 0, 2, 4, 6 and 25% carbon black. The adhesives are laid down on the film and measure approximately 0.3 mil in thickness when dried. The felt and the film are then adhered together by passing through two nip rollers in which the roller next to the film is cold and the roller next to the felt is at about 150° F. Samples of the laminates constructed with the various adhesive compositions are then cut and placed into an X–W Weather-O-Meter and exposed for 3500 hours. At given periods of time samples are removed and the peel strength of the felt adhesive bond is measured. As is seen in FIGURE 6 the laminate constructed without carbon black in the adhesive lasted approximately 1000 hours whereas the adhesive compositions with 6 and 25% carbon are still strong and durable after 3500 hours.

*Example VII*

In a final end use application the entire roof structure under weather conditions expands and contracts because of temperature changes. This requires the laminate to also expand and contract and, if the laminate has poor elasticity, it will fail. Percent elongation of a sample is an indication of its elasticity. When the adhesive of the laminate embrittles, there is a loss in elongation of the sample; therefore, to determine the adhesive embrittlement of a laminate, samples are elongated on an Instron Tester which stresses the sample and records on a chart the stress-strain curve of the laminate from which percent elongation is calculated.

Laminates of 2 mil biaxially oriented, opaque (containing 25% titanium dioxide), two-side surface receptive polyvinyl fluoride film are prepared using three different adhesives and an asbestos felted material containing approximately 18–22% neoprene binder. The first adhesive consists of a butadiene acrylonitrile copolymer similar to adhesive described in Example 4, of the U.S. Patent 2,673,826 to which has been added 10% (based on the weight of the solids in the adhesive) of the reaction product of trimethylol propane and toluene diisocyanate. This adhesive is placed on a sheet of film in a layer which measures about 0.3 mil thick when dry and the film and felted backing material are then laminated by passing between nip rollers, the roller next to the film being cold and the roller next to the felt being at approximately 150° F.

A second adhesive composition is prepared using the same constituents as the above adhesive but with the addition of 4% carbon (based on the weight of solids in the adhesive). Laminates with this adhesive are constructed in the same manner as indicated above.

A third adhesive composition is prepared using polyethyl acrylate to which is added 10% (based on the weight of solids in the adhesive) of the reaction product of trimethylol propane and toluene diisocyanate and 4% carbon on a weight basis. Laminates of this adhesive are constructed in the same manner as indicated above.

Initial elongation of these laminates is measured by an Instron Tester and the data are recorded in the table below. The samples are then exposed in an X–W Weather-O-Meter for 1000 hours and weathered in Florida for six months on a board at a 45° angle facing south; after this test period the samples are again tested for elongation. The results of this second test are also recorded below. The data obtained from the two weathering tests is essentially the same and has been recorded as such. It is noted that the laminate with the polyethyl acrylate adhesive did not embrittle and essentially retained its original characteristic whereas the other two adhesive systems even the one with the addition of carbon black embrittled and the elongation characteristics of the laminates are substantially reduced during the test.

EFFECT OF ADHESIVE EMBRITTLEMENT UPON LAMINATE ELONGATION

|  | Initial Percent Elongation | Percent Elongation [1] |
|---|---|---|
| Butadiene-Acrylonitrile Copolymer Adhesive | 257 | 7 |
| Butadiene-Acrylonitrile Copolymer Adhesive with 4% Carbon Black | 219 | 14 |
| Polyethyl Acrylate Adhesive with 4% Carbon Black | 230 | 180 |

[1] After 1,000 hours exposure in X-W Weather-O-Meter and after weathering in Florida for six months.

*Example VIII*

It is desirable to compare the bond strength of the preferred laminate structure to the laminate using a copolymer adhesive of butadiene-acrylonitrile under several accelerated weathering tests. This is accomplished by adhering a 2 mil biaxially oriented, opaque (containing 25% titanium dioxide), two-side surface receptive polyvinyl fluoride film to an asbestos felt 0.025 inch thick containing approximately 18–22% neoprene rubber. The adhesive that is used contains polyethyl acrylate to which is added 10% (based on the weight of solids in the adhesive) of a trimethylol propane toluene diisocyanate reaction product and 4% carbon on a weight basis. The adhesive is placed on a sheet of the said film in a layer which measures 0.3 mil when dry and the film and felted backing material are then laminated by passing between two nip rollers, the roll next to the film being cold and the roll next to the felt being at approximately 150° F.

Laminates are also prepared in the same manner by using an adhesive containing butadiene-acrylonitrile copolymer similar to the adhesive of Example 4 of the U.S.

Patent 2,673,826, to which is added 10% (based on the weight of solids in the adhesive) of the reaction product of trimethylol propane and toluene diisocyanate. Samples of the two laminates are then placed in an X–W Weather-O-Meter and the bond strengths are checked at 100, 150, 250, 350, 500, 1000 and 1500 hours. Samples are also placed in a weathering device which is located in Phoenix, Arizona. This device consists of a frame with 10 aluminum mirrors so mounted that they reflect the sun's rays into an asbestos holder. During the day the frame moves and follows the sun across the sky to insure that the samples always receive maximum sun light. The samples are cooled with a current of air and are also subjected to a periodic water spray for ten minutes per hour. In the evening the device is not operated. Samples are removed at 1 month and 2 months and the bond strengths are checked.

Samples are also placed in an outdoor weathering device in Florida which simply consists of a board at a 45° angle facing the sun. The bond strengths of these laminates are also checked at 1 month and at 2 months.

The bond strength is tested in the same manner as described in Example I of this application.

The results of these tests are shown in Table I.

It is noted that in all cases the bond strength of the copolymer adhesive decreased substantially with time in any of the weathering tests whereas the polyethyl acrylate based adhesive bond remained substantially the same during the weathering tests.

ing a viscosity of 3100 centipoises as measured by a Brookfield Viscometer using a #4 spindle at 60 r.p.m., 5% carbon black, and 10% (based on the weight of solids in the adhesive) of the reaction product of trimethylol propane and toluene diisocyanate. This adhesive is then diluted with methyl ethyl ketone to a viscosity of 28 sec. as measured by a No. 3 Zahn cup at 63° F.

The adhesive is applied to the film by reverse roll coating in a thickness of about 0.5 mil when dry. The reverse roll coating process consists of applying the adhesive by using two rollers; the lower roll is positioned so that it will pick up the adhesive solution and apply it to a second roll which is in contact with the film but traveling in the opposite direction of the lower roller. The adhesive coated part of the film next passes through a drying oven at approximately 105 ft./min., maintained at a temperature of approximately 230° F. to remove the solvent from the adhesive. The film is then laminated under heat and pressure to the substrate by nip rollers. The bottom roller is made of hard rubber and the top roller is of steel and heated to 200° F. The roll pressure applied is about 150 p.s.i./linear inch of roll width. The laminate has excellent adhesion and is functional as a roofing material.

The advantage of this laminate is that it will retain its original characteristics over long periods of time even under severe outdoor exposure. This makes it functional for roofing, pipe jacketing, siding for industrial buildings, siding for industrial tanks and convertible tops.

TABLE I

[Results given in grams/inch]

| Laminate | Initial Bond | X–W Weather-O-Meter | | | | | | EMMAQUA* | | Outdoor Exposures Florida | |
|---|---|---|---|---|---|---|---|---|---|---|---|
| | | 150 hr. | 250 hr. | 350 hr. | 500 hr. | 1,000 hr. | 1,500 hr. | 1 mo. | 2 mo. | 1 mo. | 2 mo. |
| Copolymer Adhesive of Butadiene-Acrylonitrile | 600 | 490 | 280 | 180 | 140 | 80 | --------- | 185 | 80 | 540 | 350 |
| Polyethyl-Acrylate based Adhesive With 4% Carbon Black | 900 | --------- | --------- | 1,435 | 1,500 | 1,600 | 1,300 | 906 | 700 | 1,060 | 1,100 |

*Equitorially Mounted Mirror Aqua water sprayed.

Example IX

Since the laminate of this invention is applied as a roofing material in which the seams are sealed with a pressure sensitive polyvinyl fluoride film tape, it is desirable to check the strength of the laminate/tape bond. This is accomplished by using a pressure sensitive polyvinyl fluoride tape which is coated on one side with a nitrile rubber bond adhesive and is adhered to the polyvinyl fluoride film of the laminate. The polyvinyl fluoride film which is used in both the tape and the laminate is a 2 mil biaxially oriented, opaque (containing 25% titanium oxide), with both sides being surface receptive. Samples of the tape/film are exposed to an X–W Weather-O-Meter for 8500 hours and show no signs of failure or delamination. Samples in the outdoor exposure test for 30 months in Florida show no sign of deterioration.

Figure 7:
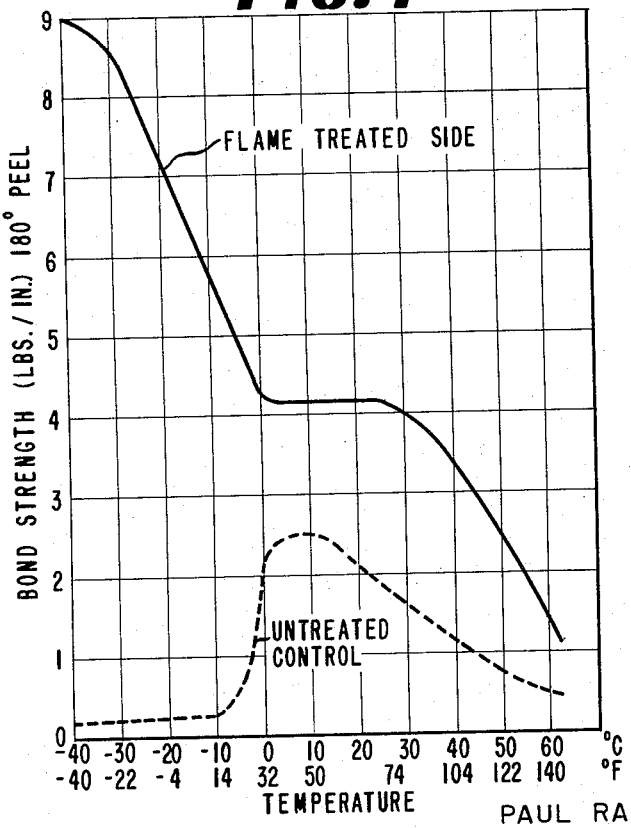

Samples of tape/film without the surface of the film being surface treated are compared to tape/film samples in which the film is treated. These two sets of samples are then exposed for 5 minutes to various temperatures from −40° F. to 140° F. The results of this test are shown in FIGURE 7. From this test it is seen that to have adequate film/tape bonds it is desirable to treat the surface of the films used.

Example X

Laminates of 2 mil biaxially oriented, opaque (containing 25% titanium dioxide), two-side surface receptive polyvinyl fluoride film are prepared on a commercial laminator using the preferred adhesive composition of this invention and an asbestos felted material 0.025 inch thick containing about 18–22% neoprene binder. The adhesive composition consists of polyethyl acrylate hav-

What is claimed is:

1. A laminated structure comprising: an opaque, surface receptive polyvinyl fluoride film; a water-resistant, resilient, flexible backing material and an adhesive intermediate said film and said backing material comprising a polyalkyl acrylate, an isocyanate curing agent and carbon black.

2. The laminate of claim 1 wherein the adhesive comprises a polyalkyl acrylate, at least 10% of an isocyanate curing agent and at least 2% carbon black.

3. A laminated structure comprising: an oriented, opaque, two-side surface receptive polyvinylfluoride film; a water-resistant, resilient, flexible backing material and an adhesive intermediate said film and said backing material comprising a polyalkyl acrylate, at least 10% of an isocyanate curing agent and at least 2% carbon black.

4. The laminate of claim 3 wherein the water-resistant, resilient, flexible backing material is an asbestos felt containing from 18 to 22% neoprene binding.

5. A laminated structure comprising: a biaxially oriented polyvinyl fluoride film containing about 25% titanium dioxide and in which both surfaces of said film contain prior to bonding functional groups selected from the group consisting of ethylenic unsaturation, hydroxyl, carboxyl, carbonyl, amino and amido groups; an asbestos felt containing from 18 to 22% neoprene binder and an adhesive intermediate said film and said asbestos felt comprising polyethyl acrylate, at least 10% of a reaction product of trimethylol propane and toluene diisocyanate and from 2 to 25% of carbon black.

6. An adhesive composition comprising a polyalkyl acrylate, at least 10% of an isocyanate curing agent and at least 2% carbon black.

7. The composition of claim 6 wherein the polyalkyl acrylate is polyethyl acrylate.

References Cited

UNITED STATES PATENTS

| | | | |
|---|---|---|---|
| 3,028,367 | 4/1962 | O'Brien | 260—77.5 |
| 3,175,997 | 3/1965 | Hsieh | 260—85.1 |
| 3,108,986 | 10/1963 | Goldberg et al. | 260—75 X |
| 3,300,927 | 1/1967 | Bettoli | 52—309 |
| 3,111,450 | 11/1963 | Stevens | 161—189 |
| 3,133,854 | 5/1964 | Simms | 161—189 |
| 3,178,394 | 4/1965 | Christenson | 260—77.5 |
| 3,228,823 | 1/1966 | Usala et al. | 161—186 |

OTHER REFERENCES

Modern Plastics, September 1961, p. 45, Scientific Library, copy in class 52; subclass 309.

EARL M. BERGERT, *Primary Examiner.*

HAROLD ANSHER, *Examiner.*